(12) United States Patent
Kroll et al.

(10) Patent No.: US 8,739,837 B2
(45) Date of Patent: *Jun. 3, 2014

(54) INSULATING MOLDED PART

(75) Inventors: Matthias Kroll, Dackenheim (DE);
Armin Buchsteiner, Sinsheim (DE)

(73) Assignee: Isolite GmbH, Ludwingshafen (DE)

( * ) Notice: Subject to any disclaimer, the term of this patent is extended or adjusted under 35 U.S.C. 154(b) by 191 days.

This patent is subject to a terminal disclaimer.

(21) Appl. No.: 13/274,320

(22) Filed: Oct. 15, 2011

(65) Prior Publication Data

US 2012/0103458 A1    May 3, 2012

(30) Foreign Application Priority Data

Oct. 20, 2010 (DE) .......................... 10 2010 048 974

(51) Int. Cl.
*F16L 9/14* (2006.01)
(52) U.S. Cl.
USPC ..................................................... 138/149
(58) Field of Classification Search
USPC .................... 138/149, 178; 428/292.1
See application file for complete search history.

(56) References Cited

U.S. PATENT DOCUMENTS

| 3,121,203 | A | * | 2/1964 | Heywang ....................... 332/164 |
| 3,235,323 | A | * | 2/1966 | Peters ............................... 8/189 |
| 3,484,183 | A | * | 12/1969 | Peters et al. .................... 8/116.1 |
| 3,864,908 | A | | 2/1975 | LaHaye .......................... 60/272 |
| 4,182,122 | A | | 1/1980 | Stratton et al. ................ 60/322 |
| 4,269,887 | A | * | 5/1981 | Sonobe et al. ............... 442/320 |
| 4,784,903 | A | * | 11/1988 | Kiss .............................. 442/381 |
| 6,726,957 | B2 | * | 4/2004 | Niemiec ...................... 427/327 |
| 7,252,868 | B2 | * | 8/2007 | Suda et al. ..................... 428/74 |
| 8,539,986 | B2 | * | 9/2013 | Kroll et al. .................... 138/149 |
| 2006/0156958 | A1 | * | 7/2006 | Simmons et al. ............. 106/600 |
| 2012/0096842 | A1 | * | 4/2012 | Kroll et al. ..................... 60/323 |
| 2012/0103457 | A1 | * | 5/2012 | Kroll et al. ................... 138/149 |

* cited by examiner

*Primary Examiner* — Kevin P Shaver
*Assistant Examiner* — Patrick M Buechner
(74) *Attorney, Agent, or Firm* — Fattibene and Fattibene LLC; Paul A. Fattibene

(57) ABSTRACT

An insulating molded part for a hot gas conducting component, in particular an exhaust system of an internal combustion engine, is described, which exhibits increased mechanical strength by using an insulating fibrous tissue.

3 Claims, 1 Drawing Sheet

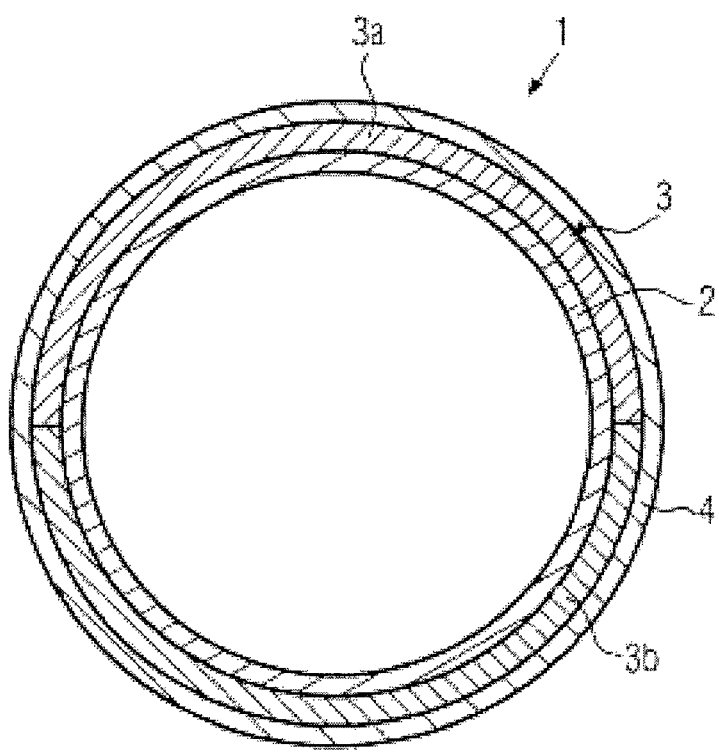

INSULATING MOLDED PART

FIELD OF THE INVENTION

The invention relates to an insulating molded part for a hot gas conducting component, in particular for an exhaust system of an internal combustion engine.

BACKGROUND OF THE INVENTION

Hot gas conducting components are often insulated with insulating molded parts, in particular in the exhaust systems for motor vehicles. These insulating molded parts consist of insulating nonwoven of glass fibers or silicate fibers which are randomly laid to form a mat and then mixed with a binder, in most cases alumina, e.g. bentonite, and pressed into a mold in a hot state. When the wall thicknesses of the insulating molded parts are small, it often happens that the fibers of the employed insulating nonwovens are excessively loaded and break, which highly affects the insulating effect. It was moreover found out that nonwoven mats, i.e. mats with randomly laid fibers, tend to lose their inner cohesion under the influence of vibrations as they regularly occur in motor vehicles, so that one cannot always prevent fibers from being "blown out", for example through inevitable screw holes, or the like.

SUMMARY OF THE INVENTION

The object underlying the invention is to provide an insulating molded part of increased mechanical strength.

This object is achieved by the features of an insulating molded part for a hot gas conducting component, in particular for an exhaust system of an internal combustion engine, which is made of an insulating fibrous tissue.

BRIEF DESCRIPTION OF THE DRAWING

The FIGURE is a cross section of a hot gas conducting component.

DETAILED DESCRIPTION OF THE PREFERRED EMBODIMENT

By the inventive use of an insulating fibrous tissue, i.e. a structure in which the fibers enter into a regular, defined and fixed connection with each other, an insulating molded part can be provided that exhibits increased resistance to mechanical loads in the manufacturing process as well as in operation. The insulating molded part according to the invention exhibits said increased strength even with very small minimum thicknesses or minimum wall thicknesses of 1 mm or less, which in particular has positive effects in press-molded parts or in case of vibrations in operation.

Preferred materials for the insulating fibrous tissue are mineral fibers, such as silicate fibers and/or glass fibers and/or ceramic fibers.

Preferably, the insulating fibers are twisted, resulting in a further increase in mechanical strength.

For the manufacture of the insulating molded part, the insulating fibrous tissue is solidified by binders and hot-pressed as it is also done with conventional insulating nonwoven mats.

To increase heat absorption or heat reflection, a proportion of color pigments can be added to the insulating fibrous tissue, wherein the color pigments are preferably added to the binder.

One embodiment of the invention will be shown below with reference to the single drawing which shows a cross-section through a hot gas conducting component with the insulating molded part according to the invention.

The hot gas conducting component 1 is preferably a part of an exhaust system of an internal combustion engine and is, for example, a conduit 2, such as an exhaust manifold or the like. The conduit 2 can be made of the usual materials, such as cast metal or sheet metal, or the like. The outer surface of the tube or conduit 2 is covered with a preferably self-supporting insulating molded part 3 which, in the represented embodiment, is assembled from two insulating bowls 3a, 3b each covering half the circumference of the tube or conduit 2 and being covered by a covering 4 to the outside.

The insulating molded part is manufactured using an insulating fibrous tissue. Insulating fibrous tissues are commercially available and consist of transverse and longitudinal threads which are interlaced with many diverse kinds of weave known from the textile field.

A particularly preferred embodiment of an insulating fibrous tissue is on the market under the trade mark Hakoterm® 1200 HG 1305. This material consists of twisted silicate fibers that have been processed to form a woven mat.

Instead of woven mats of silicate fibers, however, glass fiber woven cloth or woven cloth of similar fibers suited for insulation, e.g. mineral fibers, can be employed.

For manufacturing the insulating molded part, an adequate blank of the insulating fibrous tissue is provided with a conventional binder, for example alumina in the form of bentonite suspended in water, and then finally shaped by hot pressing.

However, color pigments can also be added to the binder which influence heat absorption and heat reflection such that on the one hand the surrounding components are protected from thermal overload, and on the other hand care is taken that, when the internal combustion engine is started, an increase in the exhaust energy is quickly achieved, resulting in a quick increase in temperature in the exhaust pipe during the warm-up time, and thereby in a reduction of $NO_x$ values and $CO_2$ emission.

A particularly suited color pigment is a copper chromite black spinell, as it is available, for example, as Black 30C965 from the Company "The Shepherd Color Company". This color pigment mainly acts in an absorbing manner. A preferably reflecting color pigment is a yellow color pigment (buff rutile on the basis of chrome, antimony and titanium), preferably YELLOW 193 of the same company.

The color pigments are preferably admixed to the binder, however, they can also get into the insulating molded body in any other way.

By the use of an insulating fibrous tissue, the insulating molded bodies can be made with very small thicknesses or wall thicknesses, wherein minimum wall thicknesses of at least 1 mm or even less can be realized, without the mechanical resistance being affected by fiber break during pressing or under load, in particular under permanent load by vibrations.

What is claimed is:

1. An insulating molded part for use in an exhaust system of an internal combustion engine comprising:
    a conduit;
    an insulated molded part formed around said conduit, said insulated molded part made of an insulating fibrous tissue;
    a binder, said binder solidifying the insulating fibrous tissue;
    a heat absorbing color pigment admixed to said binder;
    a heat reflecting color pigment admixed to said binder; and a cover covering said insulated molded part,
whereby temperature increases during warm-up time reducing $NO_x$ values and $CO_2$ emissions.

2. An insulating molded part for use in an exhaust system of an internal combustion engine as in claim 1 wherein:
said heat absorbing color pigment comprise black color pigments; and
said heat reflecting color pigment comprise yellow color pigments.

3. An insulating molded part for use in an exhaust system of an internal combustion engine as in claim 2 wherein:
the black color pigments comprise a copper chromite black spinell; and
the yellow color pigments comprise a buff rutile on the basis of chrome, antimony and titanium.

* * * * *